United States Patent
Gupta et al.

(10) Patent No.: US 12,014,161 B2
(45) Date of Patent: *Jun. 18, 2024

(54) DEPLOYMENT OF MANAGEMENT FEATURES USING CONTAINERIZED SERVICE ON MANAGEMENT DEVICE AND APPLICATION THEREOF

(71) Applicant: American Megatrends International, LLC, Duluth, GA (US)

(72) Inventors: Chitrak Gupta, Kolkata (IN); Venkatesan Balakrishnan, Chennai (IN); Anurag Bhatia, Sugar Hill, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/985,189

(22) Filed: Nov. 11, 2022

(65) Prior Publication Data

US 2024/0160425 A1    May 16, 2024

(51) Int. Cl.
*G06F 8/61* (2018.01)
*G06F 9/54* (2006.01)

(52) U.S. Cl.
CPC .............. *G06F 8/63* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 10,346,187 B1 * | 7/2019 | Trier | G06F 9/455 |
| 10,404,474 B1 * | 9/2019 | Caceres | H04L 9/3268 |
| 10,698,925 B1 * | 6/2020 | Zhao | G06F 9/455 |
| 10,846,113 B1 * | 11/2020 | Trier | G06F 8/65 |
| 10,986,174 B1 | 4/2021 | Sharma et al. | |
| 11,029,936 B2 | 6/2021 | Kaler et al. | |
| 2017/0024303 A1 * | 1/2017 | Christopher | G06F 11/366 |
| 2020/0142752 A1 | 5/2020 | Mullender et al. | |
| 2021/0397482 A1 * | 12/2021 | Lantz | G06F 9/5038 |
| 2021/0405912 A1 * | 12/2021 | Chen | G06F 8/63 |
| 2022/0357974 A1 * | 11/2022 | Gomez | G06F 9/45558 |

(Continued)

*Primary Examiner* — Philip Wang
(74) *Attorney, Agent, or Firm* — LOCKE LORD LLP; Tim Tingkang Xia, Esq.

(57) ABSTRACT

A container management infrastructure is provided for deployment of management features using a containerized service on a management device and applications thereof are provided. In operation, the infrastructure receives, from a remote computing device, an instruction to select a group of management functionalities. In response, the infrastructure retrieves a corresponding group of the services corresponding to the selected group of management functionalities from a first cloud network, creates a container image using the retrieved group of the services, and deploy the container image to a second cloud network. The second cloud network receives and stores the container image. Upon receiving a request from a remote computing device for the container image, the second cloud network sends the container image to the remote computing device, such that the container image may be executed on the remote computing device to provide a virtual management device thereon.

20 Claims, 12 Drawing Sheets

(56) References Cited

U.S. PATENT DOCUMENTS

| | | | |
|---|---|---|---|
| 2023/0094140 A1* | 3/2023 | Kruempelmann | G06F 11/3093 709/220 |
| 2023/0163967 A1* | 5/2023 | Cannata, Jr. | H04L 9/3263 713/156 |
| 2023/0244466 A1* | 8/2023 | Shah | H04L 67/34 717/178 |
| 2023/0289177 A1* | 9/2023 | Poole | G06F 9/547 |
| 2023/0409710 A1* | 12/2023 | Hen | G06F 21/51 |

* cited by examiner

DEPLOYMENT OF MANAGEMENT FEATURES USING CONTAINERIZED SERVICE ON MANAGEMENT DEVICE AND APPLICATION THEREOF

FIELD

The present disclosure relates generally to management controller technology, and more particularly to deployment of management features using a containerized service on a management device and applications thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditionally, a baseboard management controller (BMC) is a hardware device which provide the system management functionalities using standard protocols like Intelligent Platform Management Interface (IPMI), Redfish, etc. Specifically, a BMC collects management data from sensors and other on-board devices out of band and provides the data to remote applications through standardized interfaces. With increasing complexity of systems, the traditional BMC will have certain problems. For example, a newer device may not support the standard management protocols. Further, not all data will be available via out-of-band (OOB) channels, as it is not always a priority for device manufacturers to support sideband protocols. In such scenarios, in-band agents running on the OS of the BMC will be required. In addition, a BMC provides multiple features, but in many cases, only a limited set of features are used, and there is unnecessary complexity of BMC management when a very simple set of services are required. Moreover, a continuous integration and continuous deployment (CI/CD) pipeline is not possible in most cases as a new firmware update is required.

Therefore, an unaddressed need exists in the art to address the aforementioned deficiencies and inadequacies.

SUMMARY

Certain aspects of the disclosure direct to a system, which includes a container management device communicatively connected to a first cloud network and a second cloud network. The container management device includes a processor and a storage device. The storage device stores computer executable code, and the computer executable code is configured to, when executed at the processor of the container management device: receive an instruction to select a group of management functionalities; retrieve, from a plurality of services stored in the first cloud network, a corresponding group of the services corresponding to the selected group of management functionalities from the first cloud network; create a container image using the retrieved group of the services; and deploy the container image to the second cloud network. The second cloud network is configured to: receive and store the container image from the container management device; receive, from a remote computing device, a request for the container image; and send the container image to the remote computing device. The container image, when executed at the remote computing device, is configured to provide a virtual management device on the remote computing device.

In certain embodiments, the computer executable code is configured to, when executed at the processor of the container management device, receive the instruction to select the group of management functionalities from the remote computing device.

In certain embodiments, the container management device is configured to create the container image by installing the services in a base Linux distribution system.

In certain embodiments, the container management device is configured to create the container image by a continuous integration (CI) pipeline.

In certain embodiments, the container management device is configured to create the container image using a container image creation script. In one embodiment, the container image creation script is Dockerfiles.

In certain embodiments, the services stored in the first cloud network include: a web server; a Redfish core service; a sensor service; a power control service; a network interface card (NIC) management service; a storage management service; a basic input/output system (BIOS) management service; a human interface device (HID) service; a video service; a media service; a field-replaceable unit (FRU) management service; a graphics processing unit (GPU) management service; an authentication service; an Intelligent Platform Management Interface (IPMI) core service; a component management service; an event management service; and a system service.

Another aspect of the disclosure is related to a computing device, which includes a processor and a storage device, wherein the storage device stores computer executable code comprising the container image being requested and obtained from the system as described above, and the container image is configured to, when executed at the processor of the computing device, provide a virtual baseboard management controller (BMC) on the computing device.

A further aspect of the disclosure is related to a management system, which includes: a host computing device, comprising a processor and a storage device, wherein the storage device stores computer executable code comprising a plurality of device management application program interfaces (APIs) and the container image being requested and obtained from the system as described above; a plurality of devices communicatively connected to the host computing device, wherein each of the device management APIs is configured to, when executed at the processor of the host computing device, manage a corresponding one of the devices; and a baseboard management controller (BMC) communicatively connected to the host computing device, configured to manage operation of the host computing device; wherein the container image is configured to, when executed at the processor of the host computing device, provide a virtual device management controller on the computing device; and wherein the virtual device management controller is configured to interact with each of the device management APIs through an in-band (IB) interface, and to interact with the BMC through an interface under a management component transport protocol (MCTP), such that the BMC is capable of communicating with each of the device management APIs through the virtual device management controller. In certain embodiments, the interface under the MCTP is a MCTP-over-host interface (MCHI).

Yet another aspect of the disclosure is related to a distributed management system, which includes: a plurality of host computing devices, each comprising a processor and a storage device, wherein the storage device of each of the host computing devices stores computer executable code comprising a first dedicated container image, and the first dedicated container image is configured to, when executed at the processor of each of the host computing devices, provide a first virtual slave baseboard management controller (BMC) on each of the host computing devices; a plurality of accelerator devices corresponding communicatively connected to the host computing devices, each of the accelerator devices comprising a processor and a storage device, wherein the storage device of each of the accelerator devices stores computer executable code comprising a second dedicated container image, and the second dedicated container image is configured to, when executed at the processor of each of the accelerator devices, provide a second virtual slave BMC on each of the accelerator devices; and a cloud network being communicatively connected to the host computing devices and storing a third dedicated container image, wherein the third dedicated container image is configured to, when executed at the processor on the cloud network, provide a virtual master BMC on the cloud network, and the virtual master BMC on the cloud network is configured to collect data from the first virtual slave BMC on each of the host computing devices and the second virtual slave BMC on each of the accelerator devices; wherein each of the first, second and third dedicated container images is a respective container image being respectively requested and obtained from the system as described above.

Yet another aspect of the disclosure is related to a management system, which includes: a computing device, comprising a processor and a storage device, wherein the storage device stores computer executable code comprising a plurality of dedicated container images, and each of the dedicated container images is a container image being requested and obtained from the system as described above; wherein the dedicated container images comprise: a first dedicated container image, configured to, when executed at the processor, provide a virtual baseboard management controller (BMC) on the computing device; and a second dedicated container image, configured to, when executed at the processor, provide a virtual satellite management controller (SMC) on the computing device; wherein the virtual BMC and the virtual SMC are configured to interact through an out-of-band (OOB) interface.

Certain aspects of the disclosure direct to a method for deployment of management features using containerized service on a management device, which includes: receiving, at a container management device, an instruction to select a group of management functionalities; retrieving, by the container management device from a plurality of services stored in a first cloud network, a corresponding group of the services corresponding to the selected group of management functionalities; creating, by the container management device, a container image using the retrieved services; and deploying, by the container management device, the container image to a second cloud network; wherein the second cloud network is configured to: receive the container image from the container management device; receive, from a remote computing device, a request for the container image; and send the container image to the remote computing device; wherein the container image, when executed at the remote computing device, is configured to provide a virtual management device on the remote computing device.

In certain embodiments, the container management device is configured to receive the instruction to select the group of management functionalities from the remote computing device.

In certain embodiments, the container image is created by installing the services in a base Linux distribution system.

In certain embodiments, the container image is created by a continuous integration (CI) pipeline.

In certain embodiments, the container image is created using a container image creation script. In one embodiment, the container image creation script is Dockerfiles.

In certain embodiments, the services stored in the first cloud network include: a web server; a Redfish core service; a sensor service; a power control service; a network interface card (NIC) management service; a storage management service; a basic input/output system (BIOS) management service; a human interface device (HID) service; a video service; a media service; a field-replaceable unit (FRU) management service; a graphics processing unit (GPU) management service; an authentication service; an Intelligent Platform Management Interface (IPMI) core service; a component management service; an event management service; and a system service.

Certain aspects of the invention relate to a non-transitory computer readable medium storing computer executable code, wherein the computer executable code, when executed at a processor of a container management device, is configured to perform the method as described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein:

FIG. 3B schematically depicts removal of a hot-pluggable device/card with dynamic sensors from a host computing device according to certain embodiments of the present disclosure.

DETAILED DESCRIPTION

Figure 1A:
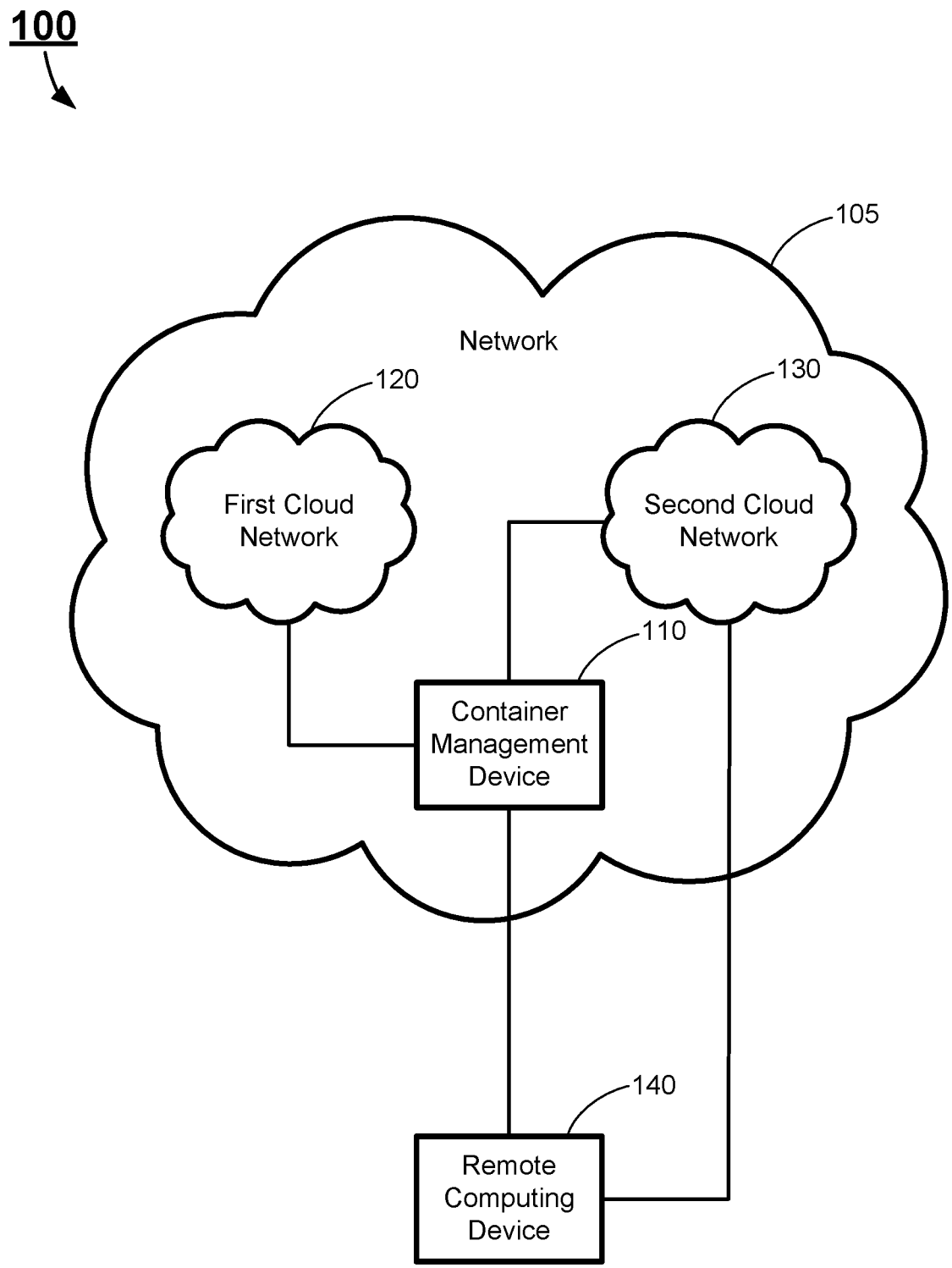
FIG. 1A schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "Linux distribution" refers to an operating system made from a software collection that includes the Linux kernel and, often, a package management system that allows services to be packaged in the Linux kernel.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, the traditional BMC may have certain problems. In view of the deficiencies of the traditional BMC, the present invention proposes to utilize a containerized software BMC or other types of virtual management devices, which may be dynamic in nature and can be hosted on any device, such as a regular host computing device or an accelerator device. The functionalities of this containerized BMC or virtual management device may be determined based on the requirement of the management services, thus allowing a third party user to perform the service creation and packing within the containerized BMC. Specifically, the service creation and packaging may be implemented by a container management infrastructure, which provides an isolated environment for service deployment and dynamic packaging architecture, and allows continuous integration and deployment of features based on the requirements. The nature of the containerized virtual management device allows the corresponding functionalities to be performed on and migrated to any platform, including the standard systems and non-standard platforms.

Certain aspects of the present disclosure direct to systems and methods for deployment of management features using a containerized service on a management device and applications thereof. FIG. 1A schematically depicts an exemplary system according to certain embodiments of the present disclosure. As shown in FIG. 1A, the system 100 includes a network 105 and a remote computing device 140 being communicatively connected to the network 105. Specifically, the network 105 includes a container management device 110, a first cloud network 120 and a second cloud network 130, and the remote computing device 140 is at least communicatively connected to the container management device 110 and the second cloud network 130. It should be noted that FIG. 1A shows only one remote computing device 140. However, the system 100 may include multiple remote computing devices 140 communicatively connected to the container management device 110 and the second cloud network 130 respectively.

The container management device 110 is a computing device (or in certain embodiments, a combination of multiple computing devices in a cloud network) used to perform container management, including service selection, creation, packaging and deployment. The first cloud network 120 and the second cloud network 130 are two cloud networks that are used to provide service repository and container image repository functions. Specifically, the first cloud network 120 functions as a service repository cloud network, and the second cloud network 130 functions as a container image repository network. As shown in FIG. 1A, the container management device 110, the first cloud network 120 and the second cloud network 130 are all included in the network 105, but are independent and separate from each other. In certain embodiments, the container management device 110 may be included in or as a part of the first cloud network 120 or the second cloud network 130. In certain embodiments, the first cloud network 120 and the second cloud network 130 may be included in or as a part of the same cloud network.

Figure 1B:
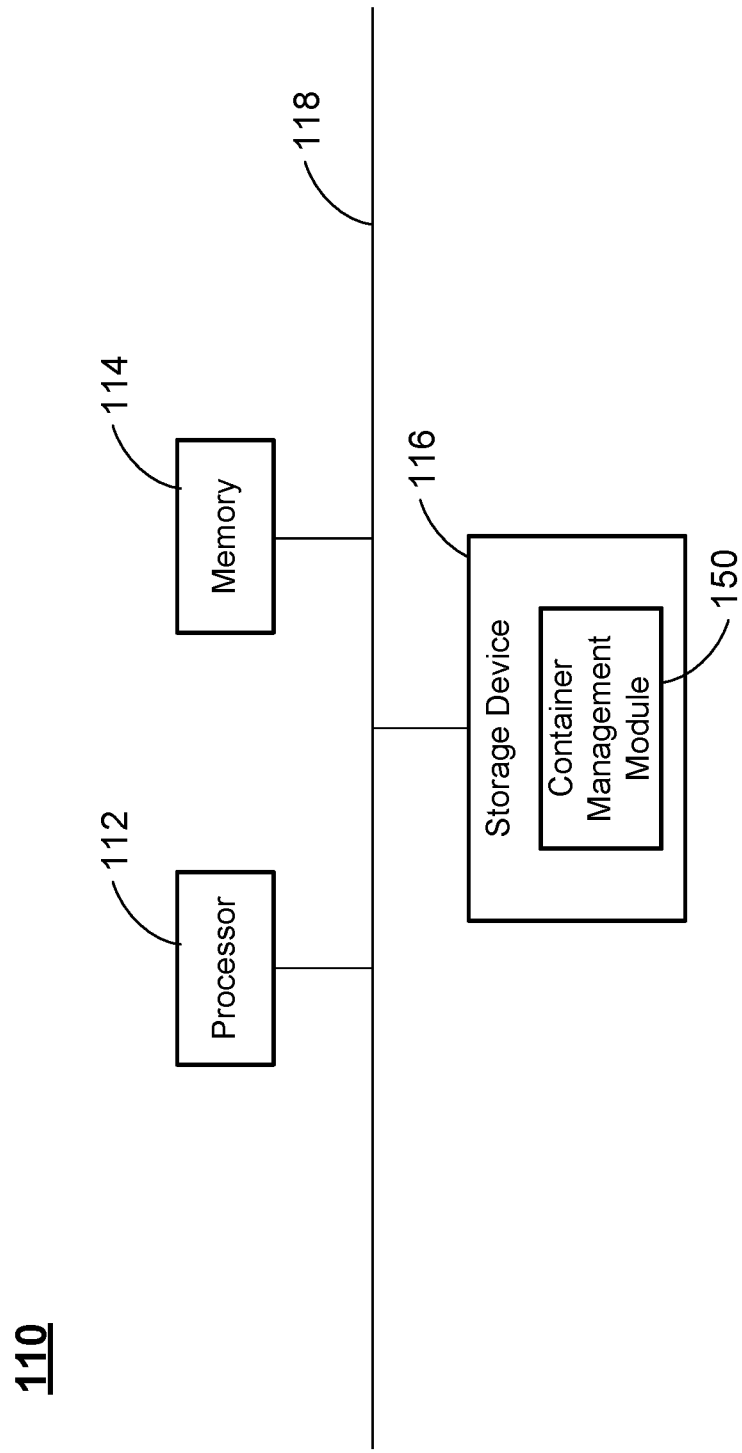
FIG. 1B schematically depicts an exemplary container management device according to certain embodiments of the present disclosure.

The container management device 110 may include necessary hardware and software components to perform certain predetermined tasks. For example, FIG. 1B schematically depicts an exemplary container management device according to certain embodiments of the present disclosure. As shown in FIG. 1B, the container management device 110 includes a processor 112, a memory 114, and a storage device 116 interconnected by a bus 118. Further, the container management device 110 may include other hardware components and software components (not shown) to perform its corresponding tasks. Examples of these hardware and software components may include, but not limited to, other required memory, interfaces, buses, network interfaces, I/O modules and peripheral devices.

The processor 112 is configured to control operation of the container management device 110. In certain embodiments, the processor 112 may be a central processing unit (CPU). The processor 112 can execute or access any computer executable code or instructions, such as the container management module 150 of the container management device 110 or other applications and instructions of the container management device 110. In certain embodiments, the container management device 110 may run on more than one processor, such as two processors, four processors, eight processors, or any suitable number of processors.

The memory 114 can be a volatile memory, such as the random-access memory (RAM), for storing the data and information during the operation of the container management device 110. In certain embodiments, the memory 114 may be a volatile memory array. In certain embodiments, the container management device 110 may include multiple volatile memory modules 114.

The storage device 116 is a non-volatile data storage media for storing the applications of the container management device 110. Examples of the storage device 116 may include flash memory, memory cards, USB drives, hard drives, floppy disks, optical drives, or any other types of non-volatile data storage devices. In certain embodiments, the container management device 110 may have multiple non-volatile memory modules 116, which may be identical storage devices or different types of storage devices, and the applications may be stored in one or more of the storage device 116 of the container management device 110.

As shown in FIG. 1B, the storage device 116 of the container management device 110 stores a container management module 150. In certain embodiments, the storage device 116 may include other applications, modules or data necessary for the operation of the container management device 110. It should be noted that the container management module 150 is implemented by computer executable codes or instructions, which may be forms to be or as a part of a software image. In certain embodiments, the container management module 150 may further include sub-modules. Alternatively, the container management module 150 may be combined with other software modules as one stack.

Figure 2:
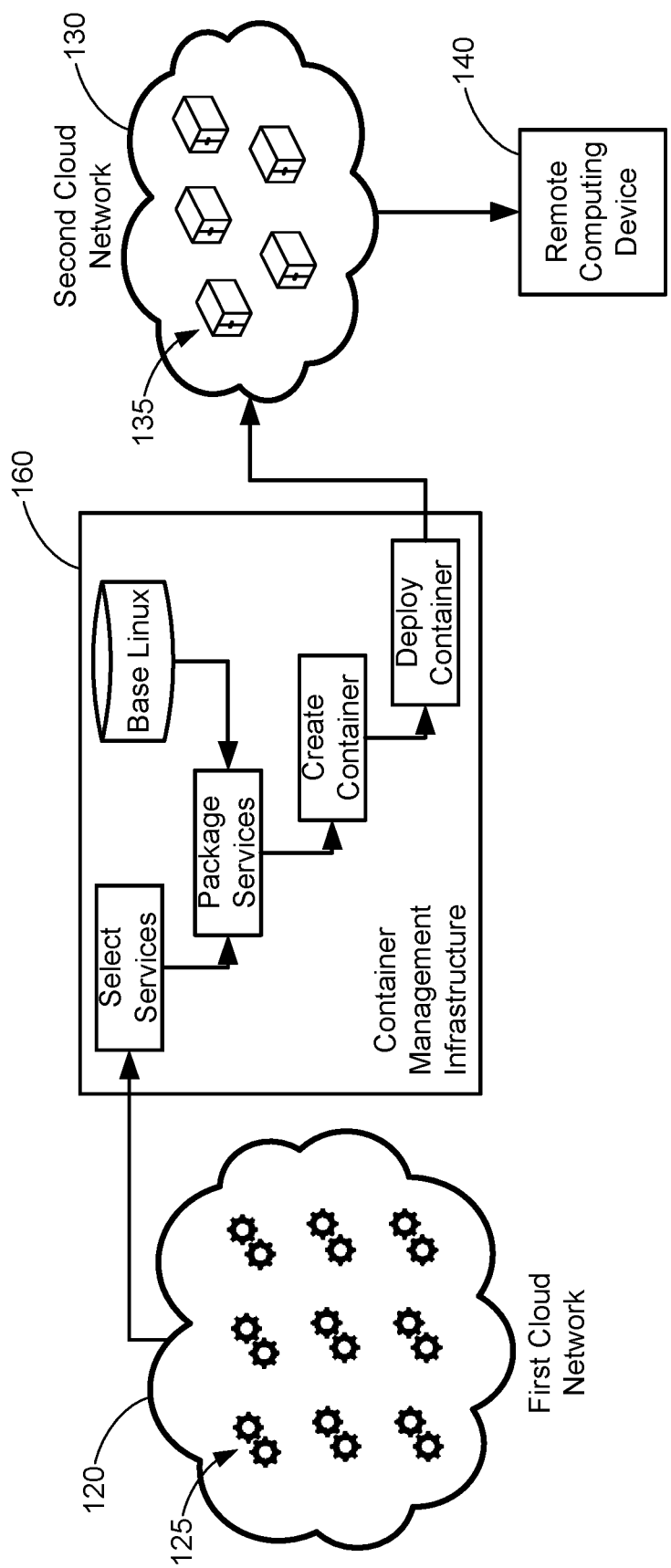
FIG. 2 schematically depicts the operation of the container management infrastructure according to certain embodiments of the present disclosure.

The container management module 150 includes the computer executable code that may be executed at the processor 112 to provide a container management infrastructure, which is the central module of the system that may be used to perform container provisioning. Specifically, the container management infrastructure may be used to create a deployable container encapsulating the services required based on instructions of the users. FIG. 2 schematically depicts the operation of the container management infrastructure according to certain embodiments of the present disclosure. As shown in FIG. 2, the first cloud network 120, which functions as a service repository cloud network, stores a plurality of services 125, and each service 125 corresponds to a specific management functionality of a virtual management device (such as a virtual BMC). In certain embodiments, the container management infrastructure 160 may create the container image by a continuous integration (CI) pipeline. Specifically, the CI pipeline includes a series of steps as shown in FIG. 2 that must be performed in order to create and deploy the container image. When the container management infrastructure 160 receives an instruction to select a group of management functionalities, the container management infrastructure 160 selects the corresponding services 125 from the first cloud network 120 based on the instruction. In particular, the container management infrastructure 160 may receive the instruction from the remote computing device 140. Once receiving the instruction, the container management infrastructure 160 determines a corresponding group of the services 125 corresponding to the selected group of management functionalities, and then retrieves the services 125 from the first cloud network 120. Once the required services 125 are retrieved, the container management infrastructure 160 then packages the retrieved group of the services 125 with a base Linux distribution system, and creates a container image using the retrieved group of the services 125. In certain embodiments, the retrieved group of the services 125 may be installed in the base Linux distribution system to create the container image. Examples of the base Linux distribution system may include, without being limited to, a Debian distribution system. Finally, the container management infrastructure 160 deploys the container image to the second cloud network 130. The second cloud network 130, which functions as a container image repository network, receives and stores the container image 135 deployed by the container management infrastructure 160. In this case, the second cloud network 130 may store a plurality of container images 135 deployed by the container management infrastructure 160. When the second cloud network 130 receives a request for a specific container image from the remote computing device 140, the second cloud network 130 may send the container image being requested to the remote computing device 140. Thus, the remote computing device 140 may execute the container image in order to provide a virtual management device (such as a virtual BMC) thereon.

With the system 100 as shown in FIGS. 1A and 1B and the container management infrastructure 160 as shown in FIG. 2, a complete management solution in a containerized environment is provided. Specifically, the container image being created and deployed may be capable of collating multiple microservices components and creating a dynamic stack as required by one or more specific management functionalities. The container image may be deployed onto any system or subsystem which can run the container image runtime. Currently, there are multiple container runtime systems existing, such as docker, rkt, lxc, etc. Most of these container runtime system are applicable to run on different platforms, such as ARM, x86 and other well-known platforms.

As shown in FIG. 2, the container management infrastructure 160 may create the container image by the CI pipeline, such that the container management infrastructure 160 will pull in required services 125 for the desired functionalities. The services 125 that are required in the container image will be pulled in as separate service archives and installed in the container image. For example, if a user wants to have a virtual BMC for only sensor management purposes, a container image with features/assets for creating a sensor management controller may be created and hosted on the desired platform. In certain embodiments, the container management infrastructure 160 may create the container image based on an automated integration process using a container image creation script. For example, in one embodiment, the container image creation script may be Dockerfiles.

Figure 3A:
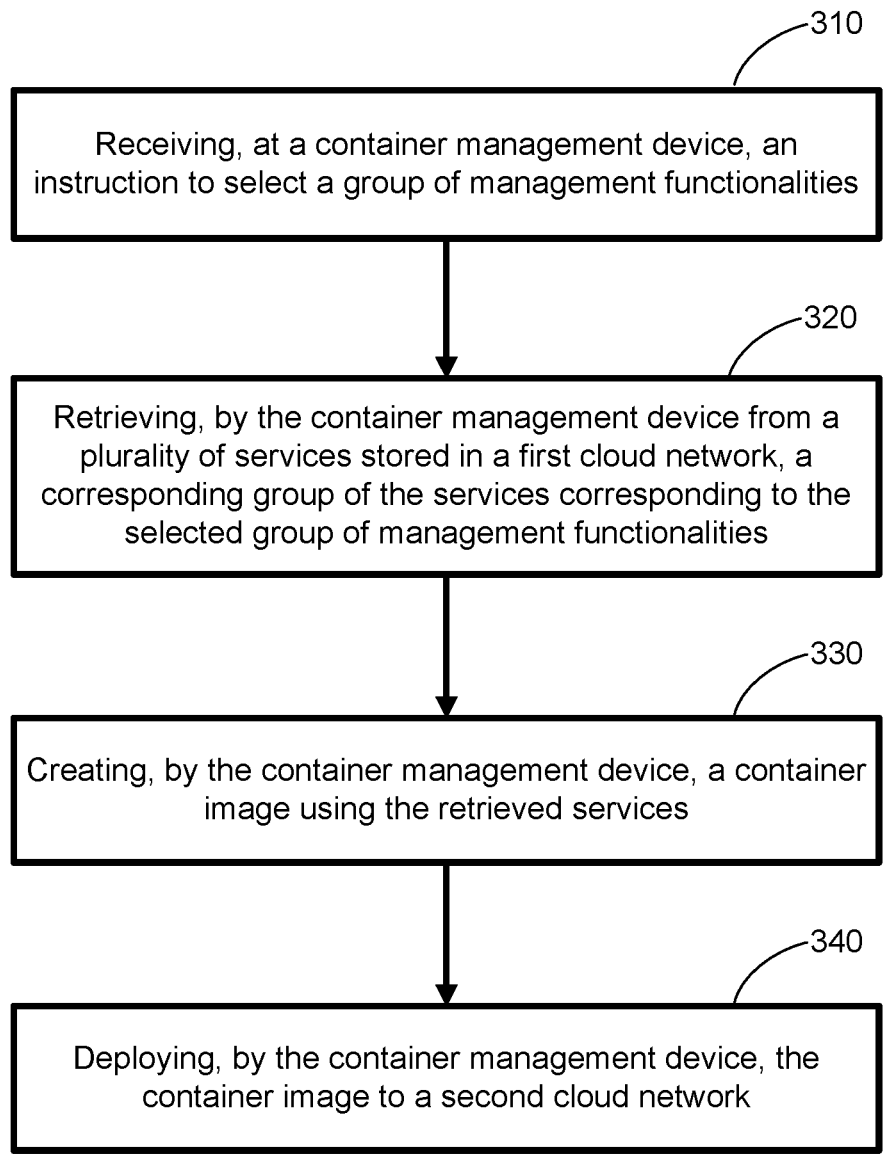
FIGS. 3A and 3B depicts a flowchart of a method for deployment of management features using containerized service on a management device according to certain embodiments of the present disclosure.
Figure 3B:
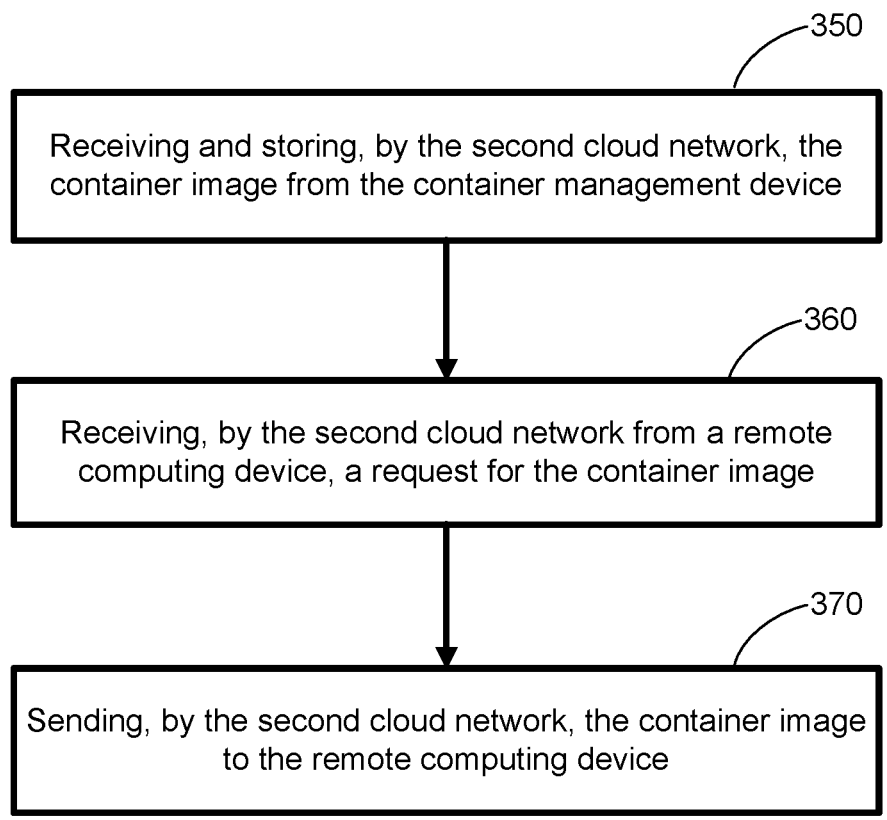

Another aspect of the disclosure relates to a method for deployment of management features using containerized service on a management device. For example, FIGS. 3A and 3B depicts a flowchart of a method for deployment of management features using containerized service on a management device according to certain embodiments of the present disclosure. In certain embodiments, the method as shown in FIGS. 3A and 3B may be implemented by the system as shown in FIGS. 1A and 1B and the operation of the container management infrastructure as shown in FIG. 2. It should be particularly noted that, unless otherwise stated in the present disclosure, the steps of the method may be arranged in a different sequential order, and are thus not limited to the sequential order as shown in FIGS. 3A and 3B.

As shown in FIG. 3A, at procedure 310, the container management device 110 (on which the container management infrastructure 160 is provided) receives an instruction to select a group of management functionalities. In certain embodiments, the instruction may be sent by a user at the remote computing device 140. Once the instruction is received, at procedure 320, the container management device 110 retrieves, from a plurality of services 125 stored in the first cloud network 120, a corresponding group of the services 125 corresponding to the selected group of management functionalities. Specifically, the container management infrastructure 160 determines a corresponding group of the services 125 corresponding to the selected group of management functionalities, and then retrieves the services 125 from the first cloud network 120. Then, at procedure 330, the container management device 110 creates a container image using the retrieved services. Once the container image is created, at procedure 340, the container management device deploys the container image to the second cloud network 130.

As shown in FIG. 3B, at procedure 350, the second cloud network 130 receives the container image from the container management device and stores the container image. At procedure 360, the second cloud network 130 receives, from the remote computing device 140, a request for the container image (or in the case where multiple container images are stored in the second cloud network 130, the request for a specific container image). At procedure 370, in response to the request, the second cloud network 130 sends the container image to the remote computing device 140. Thus, the container image may be executed at the remote computing device 140 to provide a virtual management device on the remote computing device.

In a further aspect, the present disclosure is related to a non-transitory computer readable medium storing computer executable code. The code, when executed at a processor of a controller, may perform the method as described above. In certain embodiments, the non-transitory computer readable medium may include, but not limited to, any physical storage media as the storage device 116 of the container management device 110 as shown in FIG. 1B.

Figure 4A:
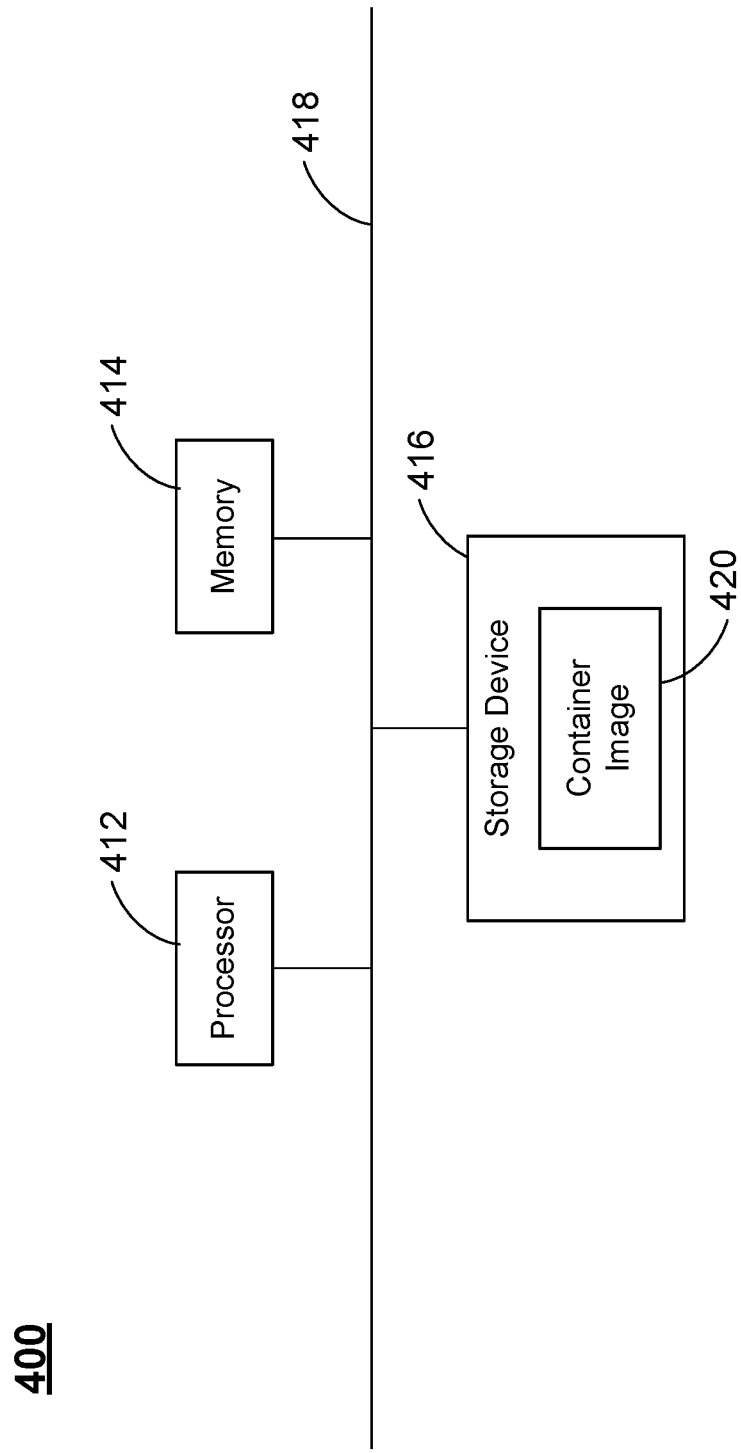
FIG. 4A schematically depicts an exemplary computing device running a virtual BMC being deployed by the container management infrastructure as shown in FIG. 2 according to certain embodiments of the present disclosure.

The system and method as described above may be applied in various applications. For example, FIG. 4A schematically depicts an exemplary computing device running a virtual BMC being deployed by the container management infrastructure as shown in FIG. 2 according to certain embodiments of the present disclosure. Specifically, the computing device 400 as shown in FIG. 4A may be a remote computing device 160 as shown in FIG. 2, which is used to request a container image from the container management infrastructure as shown in FIG. 2, such that the container image is used to provide a virtual BMC on the computing device 400. As shown in FIG. 4A, the computing device 400 includes a processor 412, a memory 414, and a storage device 416 interconnected by a bus 418. Further, the computing device 410 may include other hardware components and software components (not shown) to perform its corresponding tasks. Examples of these hardware and software components may include, but not limited to, other required memory, interfaces, buses, network interfaces, I/O modules and peripheral devices. The processor 412, the memory 414, and the storage device 416 are similar to the processor 112, the memory 114 and the storage device 116 as shown in FIG. 1B, and details thereof are not further elaborated herein.

As shown in FIG. 4A, the storage device 416 stores a container image 420. In particular, the container image 420 is a virtual BMC container image being requested and obtained from the system as described above. When the container image is executed at the processor 412 of the computing device 400, a corresponding virtual BMC is provided on the computing device 400.

Figure 4B:
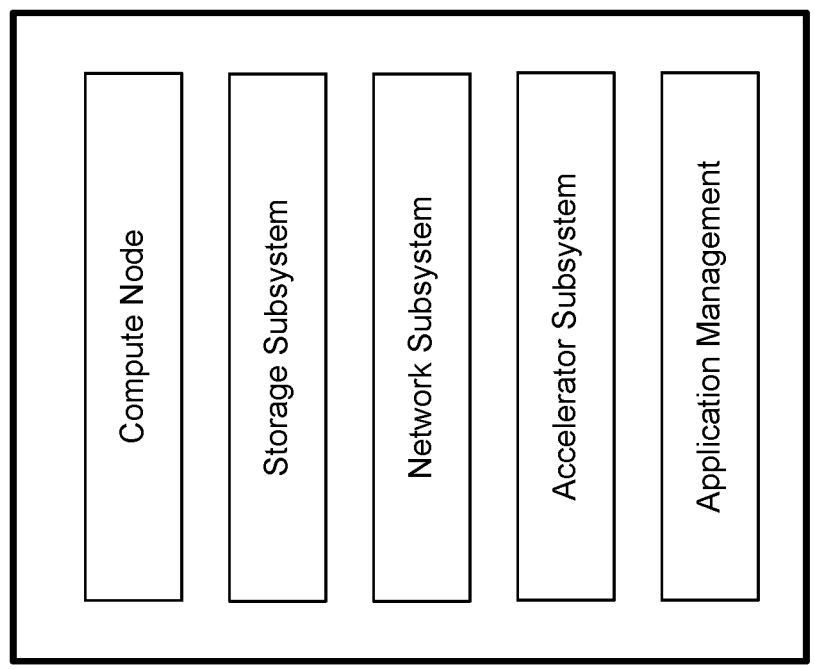
FIG. 4B schematically depicts exemplary features provided by the computing device as shown in FIG. 4A.

FIG. 4B schematically depicts exemplary features provided by the computing device as shown in FIG. 4A. As shown in FIG. 4B, the computing device 400 may function as one or more of a plurality of features, including without being limited thereto, a compute node, a storage subsystem, a network subsystem, an accelerator subsystem, and an application management feature. An exemplary embodiment of the computing device 400 as shown in FIG. 4A may be described as follows. An original equipment manufacturer (OEM) customer wants only Redfish and sensor management features on the BMC, and the typical standard BMC includes other features that the OEM customer may not need. In other words, the OEM customer requires only a personality based service processor for managing specific functions. In this case, the OEM customer may submit the requirements as an instruction to the container management infrastructure 160 as shown in FIG. 2. Once the requirement is received, the container management infrastructure 160 may generate an image composition script to include the functionalities required (i.e., Redfish and sensor management). The container management infrastructure 160, based on the image composition script, pulls the necessary service archives from the first cloud network 120, and installs the services in the base Linux (Debian) system. The container image being created will have a base Linux image and copy only the required applications and libraries as part of the archives. An indicative Docker file is shown below:

FROM debian:latest
COPY ./RedfishD
WORKDIR /Redfish/
CMD ["./RedfishD"]

The container image being created can be hosted on a container runtime system on a service processor to provide a virtual BMC with only the required Redfish and sensor management features. It should be noted that there is no need for a reboot of the service processor, and the container image can run seamlessly.

Figure 4C:
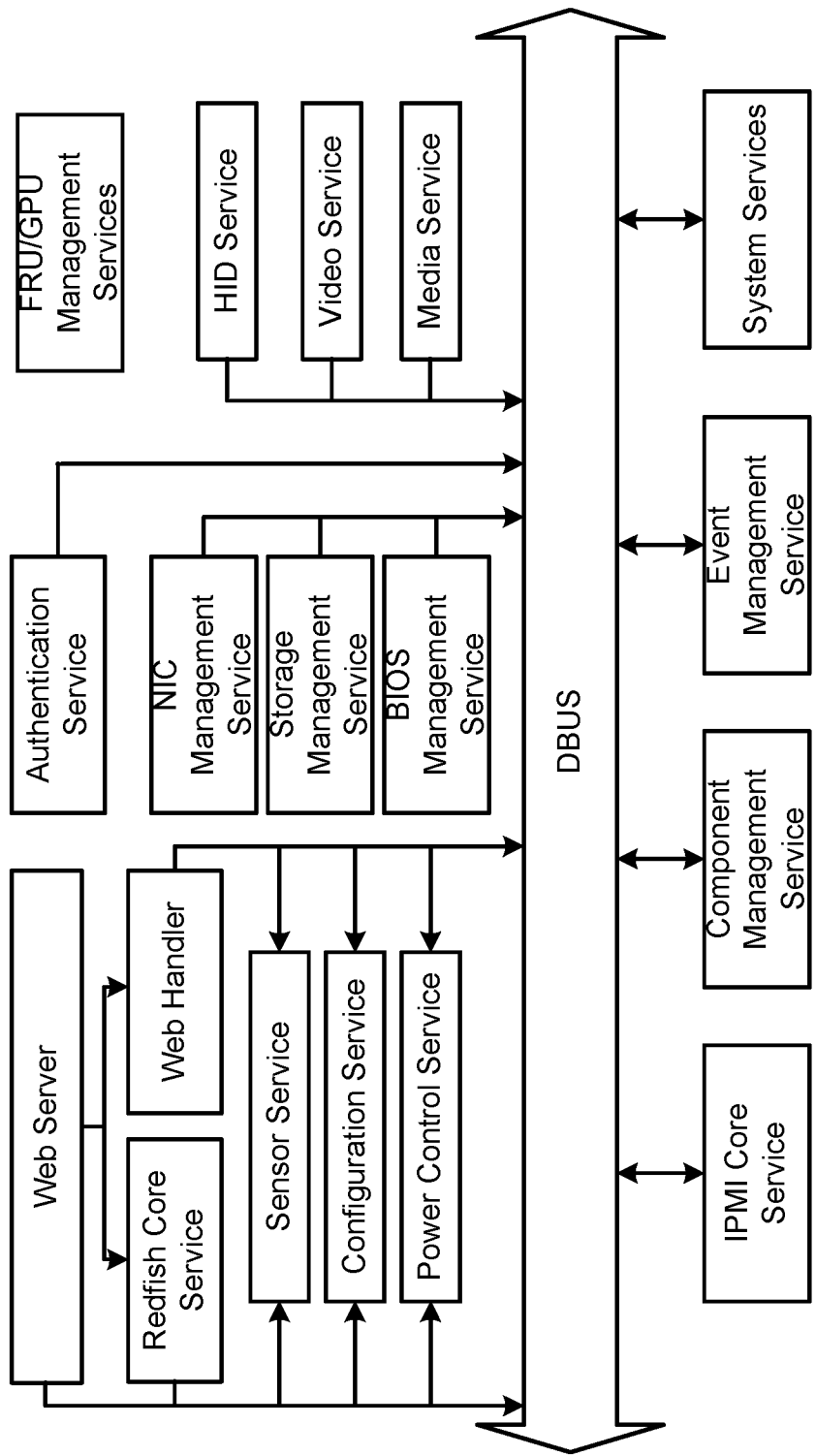
FIG. 4C schematically depicts exemplary services available for a virtual management device according to certain embodiments of the present disclosure.

In certain embodiments, all of the services stored in the first cloud network may be available for a virtual management device, such as a virtual BMC or other types of virtual management controller. For example, FIG. 4C schematically depicts exemplary services available for a virtual management device according to certain embodiments of the present disclosure. As shown in FIG. 4C, the services available may include, without being limited thereto: a web server; a Redfish core service; a sensor service; a configuration service; a power control service; a network interface card (NIC) management service; a storage management service; a basic input/output system (BIOS) management service; a human interface device (HID) service; a video service; a media service; a field-replaceable unit (FRU) management service; a graphics processing unit (GPU) management service; an authentication service; an Intelligent Platform Management Interface (IPMI) core service; a component management service; an event management service; and a system service.

Figure 5:
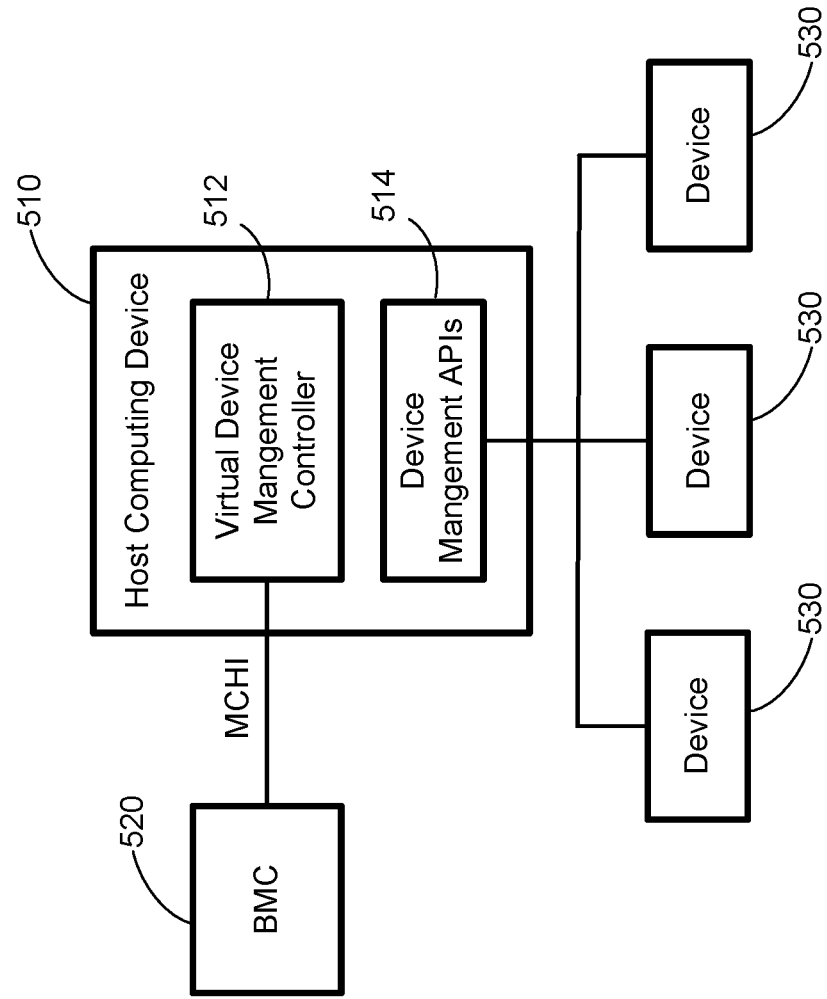
FIG. 5 schematically depicts an exemplary management system not supporting standard system management specifications running a virtual management device being deployed by the container management infrastructure as shown in FIG. 2 according to certain embodiments of the present disclosure.

In another embodiment, the computing device 400 as shown in FIG. 4A may be used in a management system that does not support standard system management specifications. For example, FIG. 5 schematically depicts an exemplary management system not supporting standard system management specifications running a virtual management device being deployed by the container management infrastructure as shown in FIG. 2 according to certain embodiments of the present disclosure. As shown in FIG. 5, the management system 500 includes a host computing device 510, a BMC 520 and a plurality of devices 530 to be managed. The host computing device 510 may be implemented by the computing device 400 as shown in FIG. 4A. Specifically, the host computing device 510 includes a plurality of device management application program interfaces (APIs) 514 that are used to manage the devices 530. Further, the host computing device 510 may execute the corresponding container image being requested and obtained from the system as described above, in order to provide a virtual management device that functions as a virtual device management controller 512.

The BMC 520 may be a regular physical BMC being installed on the host computing device 510 to manage operations of the host computing device. Typically, the BMC 520 may be used to communicate with the device management APIs 514 in order to obtain data from the devices 530 or to manage and configure the devices 530 through the device management API 514. However, the host computing device 510 may be a specific third party computing device which does not support out-of-band (OOB) standard protocols, such that the BMC cannot communicate directly with the device management APIs 514 through OOB management support channels. In this case, the device management APIs 514 may be accessible only through in-band (IB) channels. Thus, the virtual device management controller 512 may be used to interact with each of the device management APIs 514 through an IB interface, and to interact with the BMC 520 through an interface under a management component transport protocol (MCTP), such that the BMC 520 is capable of communicating with each of the device management APIs 514 through the virtual device management controller 512. In certain embodiments, the interface under the MCTP is a MCTP-over-host interface (MCHI). Thus, the virtual device management controller 512 may be used to communicate with the device management APIs 514 to get the data from the devices 530 and communicate the same data back to the BMC 520 using MCHI, allowing the BMC to communicate with the virtual device management controller 512 on the host computing device 510 to configure the devices 530 thereon. Details of the MCHI may be available in the Management Component Transport Protocol (MCTP) Host Interface Specification.

Figure 6A:
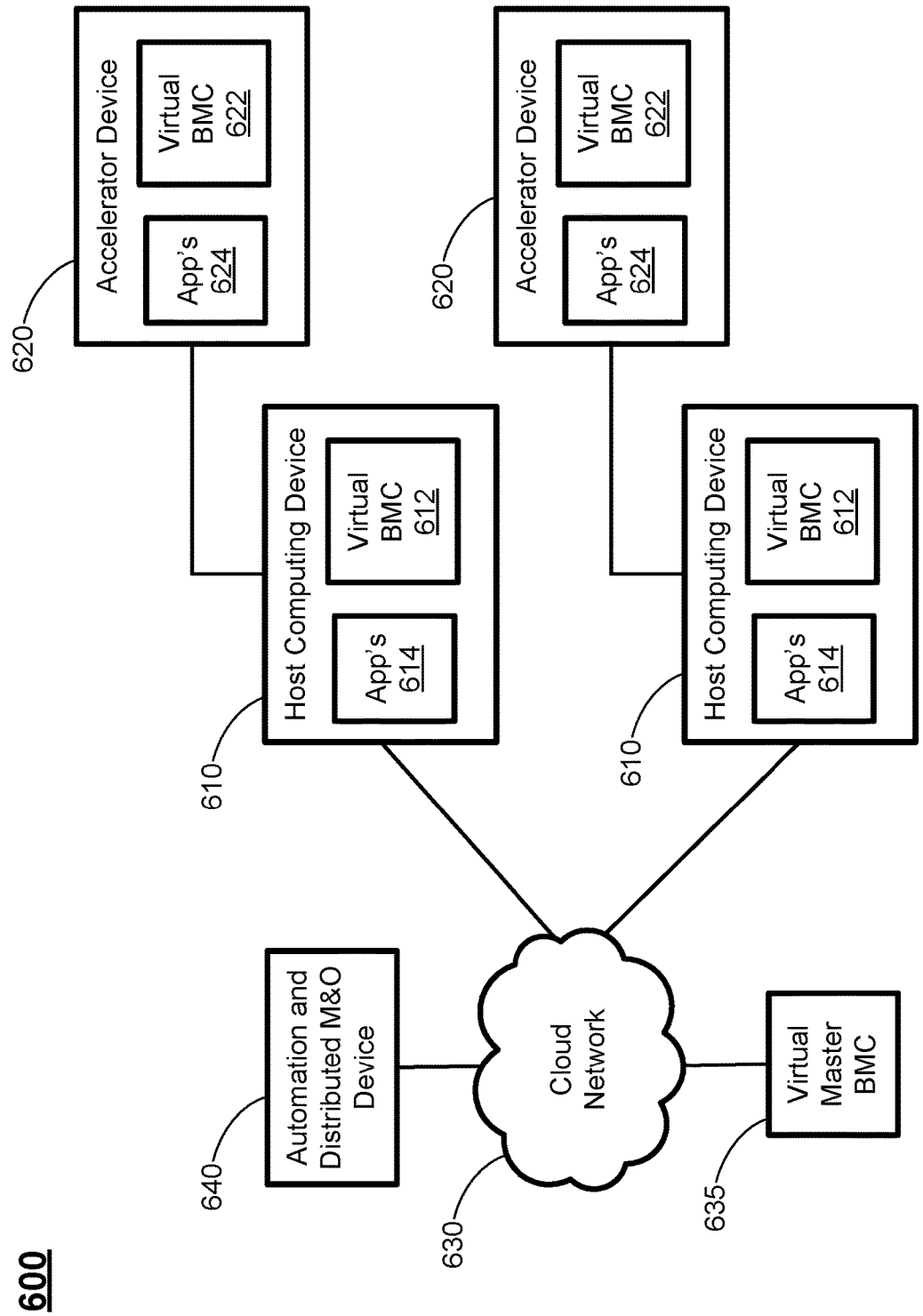
FIG. 6A schematically depicts an exemplary distributed management system including a master-slave BMC system being deployed by the container management infrastructure as shown in FIG. 2 according to certain embodiments of the present disclosure.

In another embodiment, the computing device 400 as shown in FIG. 4A may be used in a distributed management system that includes host and accelerator devices running their own slave BMC images, and a master BMC is provided to act as an aggregator of the data and a presentation layer for collecting data from all of the slave BMC images. For example, FIG. 6A schematically depicts an exemplary distributed management system including a master-slave BMC system being deployed by the container management infrastructure as shown in FIG. 2 according to certain embodiments of the present disclosure. As shown in FIG. 6A, the distributed management system 600 includes a plurality of host computing device 610, a plurality of accelerator devices 620, a cloud network 630, and an automation and distributed management and operating (M&O) device 640. Specifically, each of the host computing devices 610 and the accelerator devices 620 may be implemented by a computing device 400 as shown in FIG. 4A. Similarly, the cloud network 630 may include a computing device, which may be implemented by another computing device 400 as shown in FIG. 4A.

Figure 6B:
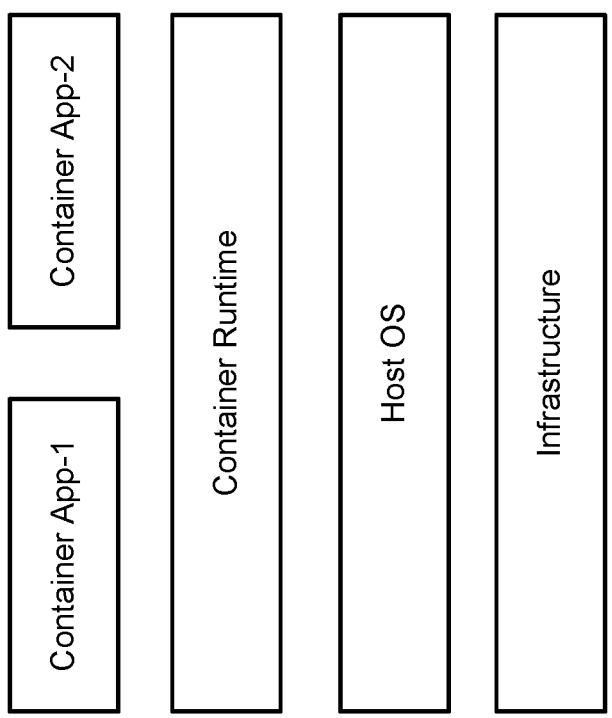
FIG. 6B schematically shows a block diagram of the infrastructure of a host computing device as shown in FIG. 6A.

In particular, the corresponding container image on each host computing device 610 and each accelerator device 620 may be a dedicated container image. Thus, when each host computing device 610 and each accelerator device 620 respectively executes the corresponding dedicated container image, each host computing device 610 is provided with a corresponding virtual BMC 612, and each accelerator device 620 is provided with a corresponding virtual BMC 622. Further, each host computing device 610 has a plurality of applications 614 to be managed by the virtual BMC 612, and each accelerator device 620 has a plurality of applications 624 to be managed by the virtual BMC 622. FIG. 6B schematically shows a block diagram of the infrastructure of a host computing device as shown in FIG. 6A. As shown in FIG. 6B, the host computing device includes a host OS running on the infrastructure, and the container runtime runs on the host OS. The apps may run the container as container apps. Further, the container image on the cloud network 630 is also a different dedicated container image. Thus, when the dedicated container image is executed on the cloud network 630, a virtual master BMC is provided thereon. In this case, the virtual BMCs 612 and 622 on the host computing devices 610 and the accelerator devices 620 may function as virtual slave BMCs, and the virtual master BMC 635 on the cloud network 630 and the virtual BMCs 612 and 622 on the host computing devices 610 and the accelerator devices 620 may form a master-slave BMC system. Thus, the virtual master BMC 635 on the cloud network 630 may collect data from the virtual slave BMC 612 on each host computing device 610 and the virtual slave BMC 622 on each accelerator device 620, thus aggregating the data being collected and forwarding/presenting the aggregated data to the automation and distributed M&O device 640 for further processing purposes.

Figure 7:
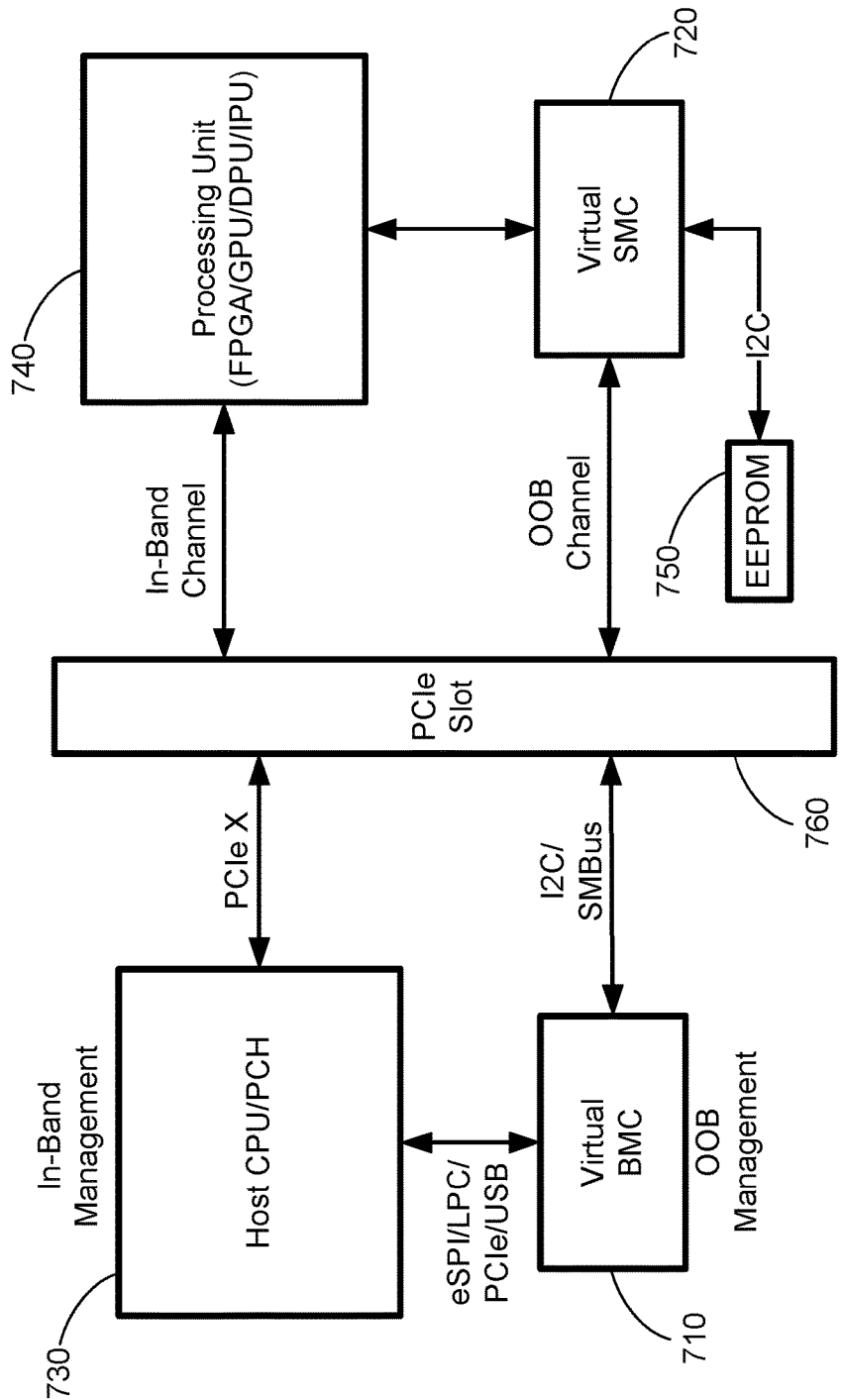
FIG. 7 schematically shows an exemplary management system with multiple virtual management devices being deployed by the container management infrastructure as shown in FIG. 2 according to certain embodiments of the present disclosure.

In each of the embodiments as described above, the computing device may be used to host a virtual management device being requested and obtained from the system and method as described above. In another embodiment, the computing device 400 as shown in FIG. 4A may be used in a management system that includes multiple virtual management devices being requested and obtained from the system and method as described above. For example, FIG. 7 schematically shows an exemplary management system with multiple virtual management devices being deployed by the container management infrastructure as shown in FIG. 2 according to certain embodiments of the present disclosure. As shown in FIG. 7, the management system includes a computing device 700, which may be implemented by a computing device 400 as shown in FIG. 4A. However, instead of obtaining a single container image with a complete management device, the computing device 700 includes two separate dedicated container images with corresponding dedicated services and functionalities. Specifically, one of the two dedicated container images is used to provide a virtual BMC 710, and the other of the two dedicated container images is used to provide a virtual satellite management controller (SMC) 720. In such a setup, the virtual BMC 710 can run the necessary containerized BMC features to perform OOB management and communicate with the host CPU/PCH 730, and the virtual SMC 720 can host a subset of features (such as FRU management service, GPU management service) and communicate with the corresponding processing unit (FPGA/CPU/DPU/IPU) 740 and the EEPROM 750. The the host CPU/PCH 730 and the processing unit (FPGA/CPU/DPU/IPU) 740 may interact through the PCIe slot 760, and the virtual BMC 710 and the virtual SMC may interact with the each other using OOB interfaces.

The embodiments of the present disclosure as described above may be used as a systems management solution, enabling microservices driven architecture for the users and customers. In certain embodiments, the container management infrastructure implemented may lend itself to creating innovative solutions where specific functional blocks can be created for the customers, and allow the service developers to focus on improving the time to market for features and updates. With the system and method as described above, any customer may download the new services and pull into the container or create a container of choice for deploying a virtual BMC or other types of virtual management devices. Further, the system and method as described above enable distributed management capabilities and the method to deploy the services even without dedicated BMC hardware, thus creating a platform with expanded service-driven and solution offerings.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a container management device communicatively connected to a first cloud network and a second cloud network, comprising a processor and a storage device, wherein the storage device stores computer executable code, wherein the computer executable code is configured to, when executed at the processor of the container management device:
   receive an instruction to select a group of management functionalities;
   retrieve, from a plurality of services stored in the first cloud network, a corresponding group of the services corresponding to the selected group of management functionalities from the first cloud network;

create a container image using the retrieved group of the services; and
deploy the container image to the second cloud network,
wherein the second cloud network is configured to:
receive and store the container image from the container management device;
receive, from a remote computing device, a request for the container image; and
send the container image to the remote computing device;
wherein the container image, when executed at the remote computing device, is configured to provide a virtual management device on the remote computing device,
wherein the virtual management device is a virtual baseboard management controller (BMC).

2. The system of claim 1, wherein the computer executable code is configured to, when executed at the processor of the container management device, receive the instruction to select the group of management functionalities from the remote computing device.

3. The system of claim 1, wherein the container management device is configured to create the container image by installing the services in a base Linux distribution system.

4. The system of claim 1, wherein the container management device is configured to create the container image by a continuous integration (CI) pipeline.

5. The system of claim 1, wherein the container management device is configured to create the container image using a container image creation script.

6. The system of claim 5, wherein the container image creation script is Dockerfiles.

7. The system of claim 1, wherein the services stored in the first cloud network comprise:
a web server;
a Redfish core service;
a sensor service;
a power control service;
a network interface card (NIC) management service;
a storage management service;
a basic input/output system (BIOS) management service;
a human interface device (HID) service;
a video service;
a media service;
a field-replaceable unit (FRU) management service;
a graphics processing unit (GPU) management service;
an authentication service;
an Intelligent Platform Management Interface (IPMI) core service;
a component management service;
an event management service; and
a system service.

8. A computing device, comprising a processor and a storage device, wherein the storage device stores computer executable code comprising the container image being requested and obtained from the system of claim 1, and the container image is configured to, when executed at the processor of the computing device, provide the virtual BMC on the computing device.

9. A management system, comprising:
a host computing device, comprising a processor and a storage device, wherein the storage device stores computer executable code comprising a plurality of device management application program interfaces (APIs) and the container image being requested and obtained from the system of claim 1;
a plurality of devices communicatively connected to the host computing device, wherein each of the device management APIs is configured to, when executed at the processor of the host computing device, manage a corresponding one of the devices; and
a baseboard management controller (BMC) communicatively connected to the host computing device, configured to manage operation of the host computing device;
wherein the container image is configured to, when executed at the processor of the host computing device, provide a virtual device management controller on the computing device; and
wherein the virtual device management controller is configured to interact with each of the device management APIs through an in-band (IB) interface, and to interact with the BMC through an interface under a management component transport protocol (MCTP), such that the BMC is capable of communicating with each of the device management APIs through the virtual device management controller.

10. The management system of claim 9, wherein the interface under the MCTP is a MCTP-over-host interface (MCHI).

11. A distributed management system, comprising:
a plurality of host computing devices, each comprising a processor and a storage device, wherein the storage device of each of the host computing devices stores computer executable code comprising a first dedicated container image, and the first dedicated container image is configured to, when executed at the processor of each of the host computing devices, provide a first virtual slave baseboard management controller (BMC) on each of the host computing devices;
a plurality of accelerator devices corresponding communicatively connected to the host computing devices, each of the accelerator devices comprising a processor and a storage device, wherein the storage device of each of the accelerator devices stores computer executable code comprising a second dedicated container image, and the second dedicated container image is configured to, when executed at the processor of each of the accelerator devices, provide a second virtual slave BMC on each of the accelerator devices; and
a cloud network being communicatively connected to the host computing devices and storing a third dedicated container image, wherein the third dedicated container image is configured to, when executed at the processor on the cloud network, provide a virtual master BMC on the cloud network, and the virtual master BMC on the cloud network is configured to collect data from the first virtual slave BMC on each of the host computing devices and the second virtual slave BMC on each of the accelerator devices;
wherein each of the first, second and third dedicated container images is a respective container image being respectively requested and obtained from the system of claim 1.

12. A management system, comprising:
a computing device, comprising a processor and a storage device, wherein the storage device stores computer executable code comprising a plurality of dedicated container images, and each of the dedicated container images is a container image being requested and obtained from the system of claim 1;
wherein the dedicated container images comprise:

a first dedicated container image, configured to, when executed at the processor, provide a virtual baseboard management controller (BMC) on the computing device; and a second dedicated container image, configured to, when executed at the processor, provide a virtual satellite management controller (SMC) on the computing device;

wherein the virtual BMC and the virtual SMC are configured to interact through an out-of-band (OOB) interface.

13. A method for deployment of management features using containerized service on a management device, comprising:

receiving, at a container management device, an instruction to select a group of management functionalities;

retrieving, by the container management device from a plurality of services stored in a first cloud network, a corresponding group of the services corresponding to the selected group of management functionalities;

creating, by the container management device, a container image using the retrieved services; and deploying, by the container management device, the container image to a second cloud network;

wherein the second cloud network is configured to:

receive the container image from the container management device;

receive, from a remote computing device, a request for the container image; and send the container image to the remote computing device;

wherein the container image, when executed at the remote computing device, is configured to provide a virtual management device on the remote computing device, wherein the virtual management device is a virtual baseboard management controller (BMC).

14. The method of claim 13, wherein the container management device is configured to receive the instruction to select the group of management functionalities from the remote computing device.

15. The method of claim 13, wherein the container image is created by installing the services in a base Linux distribution system.

16. The method of claim 13, wherein the container image is created by a continuous integration (CI) pipeline.

17. The method of claim 13, wherein the container image is created using a container image creation script.

18. The method of claim 17, wherein the container image creation script is Dockerfiles.

19. The method of claim 13, wherein the services stored in the first cloud network comprise:

a web server;
a Redfish core service;
a sensor service;
a power control service;
a network interface card (NIC) management service;
a storage management service;
a basic input/output system (BIOS) management service;
a human interface device (HID) service;
a video service;
a media service;
a field-replaceable unit (FRU) management service;
a graphics processing unit (GPU) management service;
an authentication service;
an Intelligent Platform Management Interface (IPMI) core service;
a component management service;
an event management service; and
a system service.

20. A non-transitory computer readable medium storing computer executable code, wherein the computer executable code, when executed at a processor of a container management device, is configured to perform the method of claim 13.

* * * * *